United States Patent [19]

Ortloff et al.

[11] Patent Number: 5,720,501
[45] Date of Patent: Feb. 24, 1998

[54] SWIVEL JOINT ELBOW ORIENTATION DEVICE

[75] Inventors: Charles R. Ortloff, Los Gatos, Calif.; Tep Ungchusri, Woodlands, Tex.

[73] Assignee: FMC Corporation, Chicago, Ill.

[21] Appl. No.: 717,380

[22] Filed: Sep. 23, 1996

[51] Int. Cl.⁶ .................................................. F16L 35/00
[52] U.S. Cl. ........................... 285/93; 285/181; 285/184; 285/272
[58] Field of Search ........................... 285/93, 181, 184, 285/272, 275, 276, 280, 282

[56] References Cited

U.S. PATENT DOCUMENTS

| | | | |
|---|---|---|---|
| 2,879,083 | 3/1959 | Corsette | 285/181 X |
| 3,480,300 | 11/1969 | Jeffery et al. | 285/93 |
| 4,077,657 | 3/1978 | Trzeciak | 285/93 X |
| 4,098,695 | 7/1978 | Novotny | 285/93 X |
| 5,044,674 | 9/1991 | Hendrickson | 285/184 X |
| 5,242,112 | 9/1993 | Dunn et al. | 285/181 X |

*Primary Examiner*—Terry Lee Melius
*Assistant Examiner*—Heather Shackelford
*Attorney, Agent, or Firm*—Henry C. Query, Jr.

[57] ABSTRACT

In combination with a dual elbow swivel joint having a female elbow member rotationally coupled to a male elbow member, the invention comprises an orientation device having an angle marker located on one elbow member and an indicator mark located on the other elbow member. The angle marker contains a number of angle markings located at predetermined angles measured from the central axis of the elbow member. The indicator mark is placed on the other elbow member in a location such that, when aligned with an angle marking, the elbow members are in a predetermined angular orientation relative to each other. The angle markings on the angle marker each have a length which is related to the amount of wear that has been found to occur in the dual elbow swivel joint when the female and male members are oriented at that particular angle. Thus, the orientation device enables an operator to orient the female and male elbow members at an angle at which the dual elbow swivel joint will experience the least amount of wear.

3 Claims, 4 Drawing Sheets

SWIVEL JOINT ELBOW ORIENTATION DEVICE

BACKGROUND OF THE INVENTION

1. Field of the Invention

The present invention relates to a dual elbow swivel joint and, more particularly, an orientation device for assisting an operator in establishing a desired relative angle between the female elbow member and the male elbow member.

2. Description of Related Art

Dual elbow swivel joints typically comprise a female elbow member rotationally coupled to a male elbow member. In certain applications, such as well fractionating operations, elbow joints are used to convey relatively abrasive materials. Because the elbow joints are used to change the direction of flow of the material, they are subject to substantial erosive wear from the material. It has been found through experimentation and numerical analysis that the degree of wear varies depending on the relative angle between the female elbow member and the male elbow member.

SUMMARY OF THE INVENTION

Accordingly, the present invention is directed to a device for visually indicating the relative angle between the female and male elbow members and the relative degree of wear to be expected at each of a predetermined number of angles. Thus, in combination with a dual elbow swivel joint having a female elbow member rotationally coupled to a male elbow member, the invention comprises an orientation device having an angle marker located on one elbow member and an indicator mark located on the other elbow member. The angle marker contains a reference mark and a number of additional angle markings spaced from the reference mark at predetermined angles measured from the central axis of the elbow member. The indicator mark is placed on the other elbow member in a location such that, when aligned with the reference mark, the elbow members are in a predetermined angular orientation relative to each other. In this manner, the relative angle between the female and male elbow members can be set by aligning the indicator mark with one of the angle markings.

In another aspect of the invention, the reference mark and the angle markings on the angle marker each have a length which is related to the amount of wear that has been found to occur in the dual elbow swivel joint when the female and male members are oriented at that particular angle. Thus, the orientation device enables an operator to orient the female and male elbow members at an angle at which the dual elbow swivel joint will experience the least amount of wear.

These and other objects and advantages of the present invention will be made apparent from the following detailed description, with reference to the accompanying drawings.

DETAILED DESCRIPTION OF THE PREFERRED EMBODIMENTS

Figure 1A:
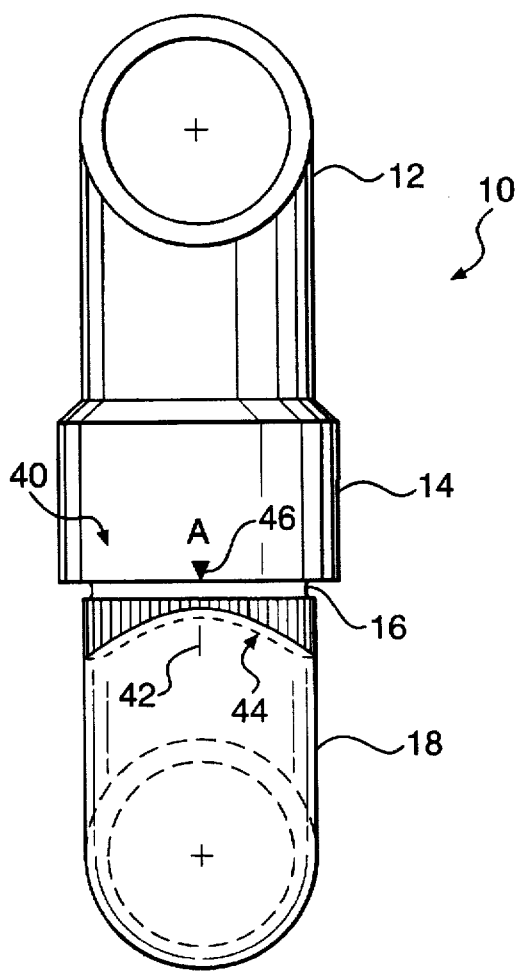
FIGS. 1A and 1B are front and side elevation views, respectively, of a dual elbow swivel joint incorporating the angle marker of the present invention.
Figure 1B:
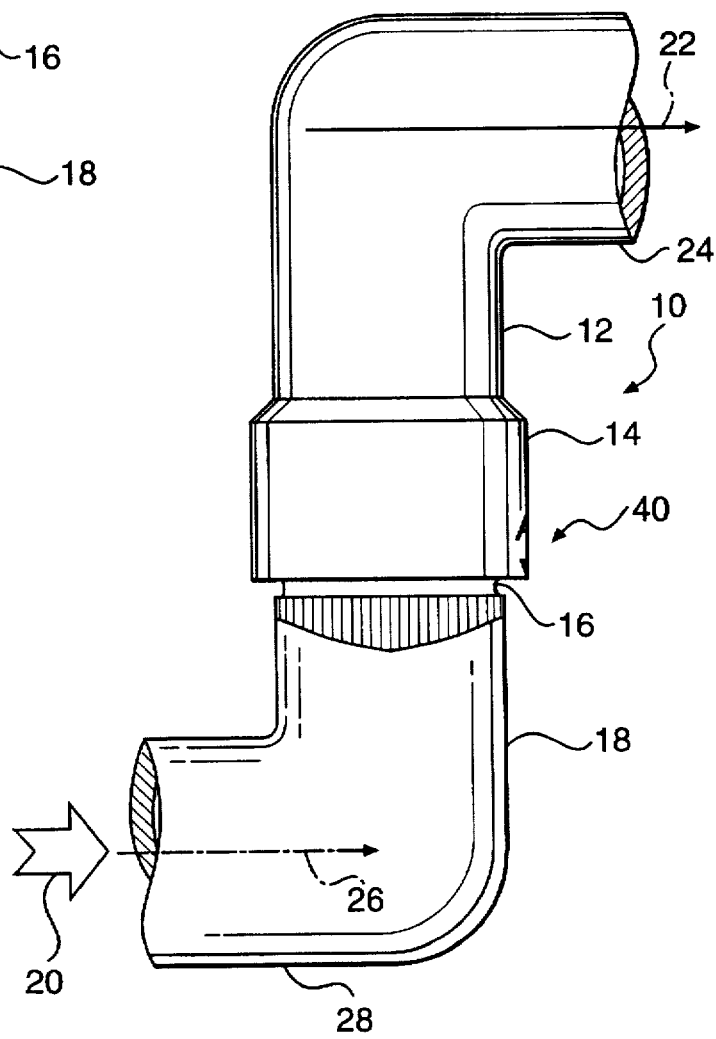

Referring to FIG. 1, dual elbow swivel joint, indicated generally by reference number 10, is shown to comprise a tubular female elbow member 12 having an enlarged shroud 14 which is adapted to receive a first end 16 of a tubular male elbow member 18. The inner surface of shroud 14 and the outer surface of first end 16 have one or more radial grooves formed therein which, when aligned, define races (not shown) into which bearings are inserted to rotationally couple female elbow member 12 to male elbow member 18. For purposes of this description, when material is assumed to flow through dual elbow swivel joint 10 in the direction indicated by arrow 20, female elbow member 12 is defined to have a direction indicated by arrow 22, which is collinear with the centerline of the horizontal straight-line portion 24 of female elbow member 12, and male elbow member 18 is defined to have a direction indicated by arrow 26, which is collinear with the horizontal straight-line portion 28 of male elbow member 18. Thus, in FIG. 1B the direction 22 of female elbow member 12 is aligned with the direction 26 of male elbow member 18, that is, the angle between female elbow member 12 and male elbow member 18 is 0°.

Figure 2A:
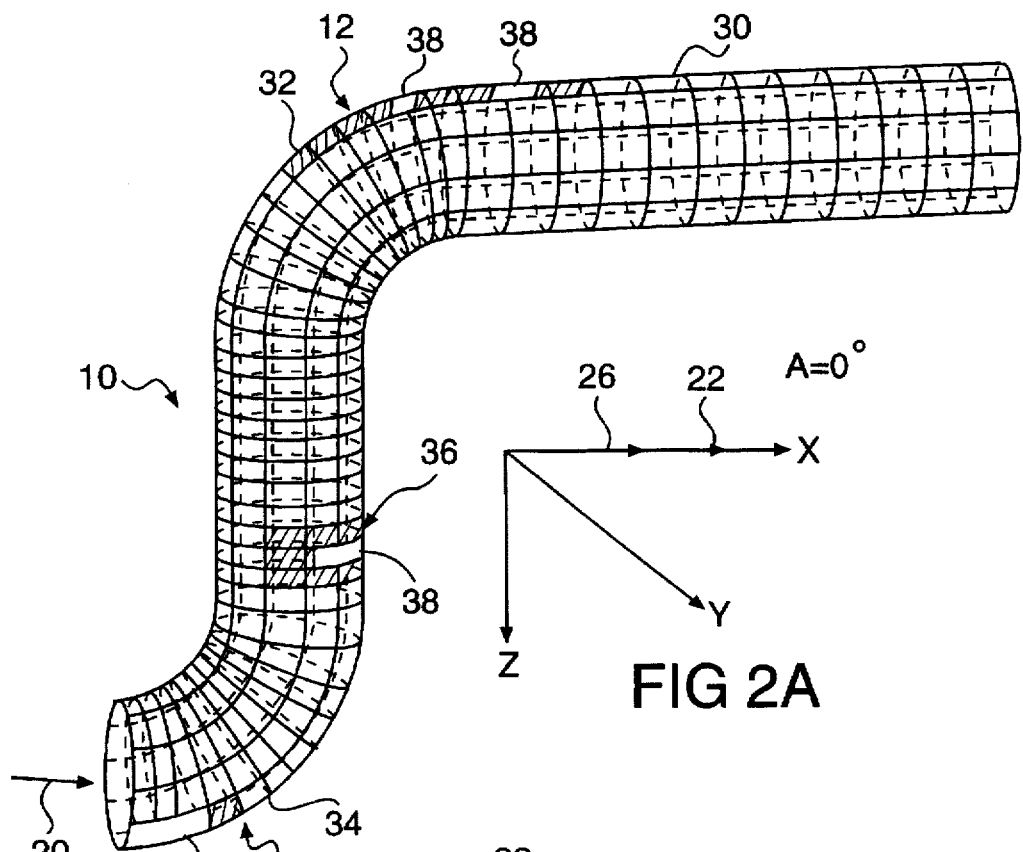
FIGS. 2A through 2E are perspective representations showing the maximum wear zones experienced during testing of a dual elbow swivel joint for various angular orientations of the female and male elbow members.
Figure 2B:
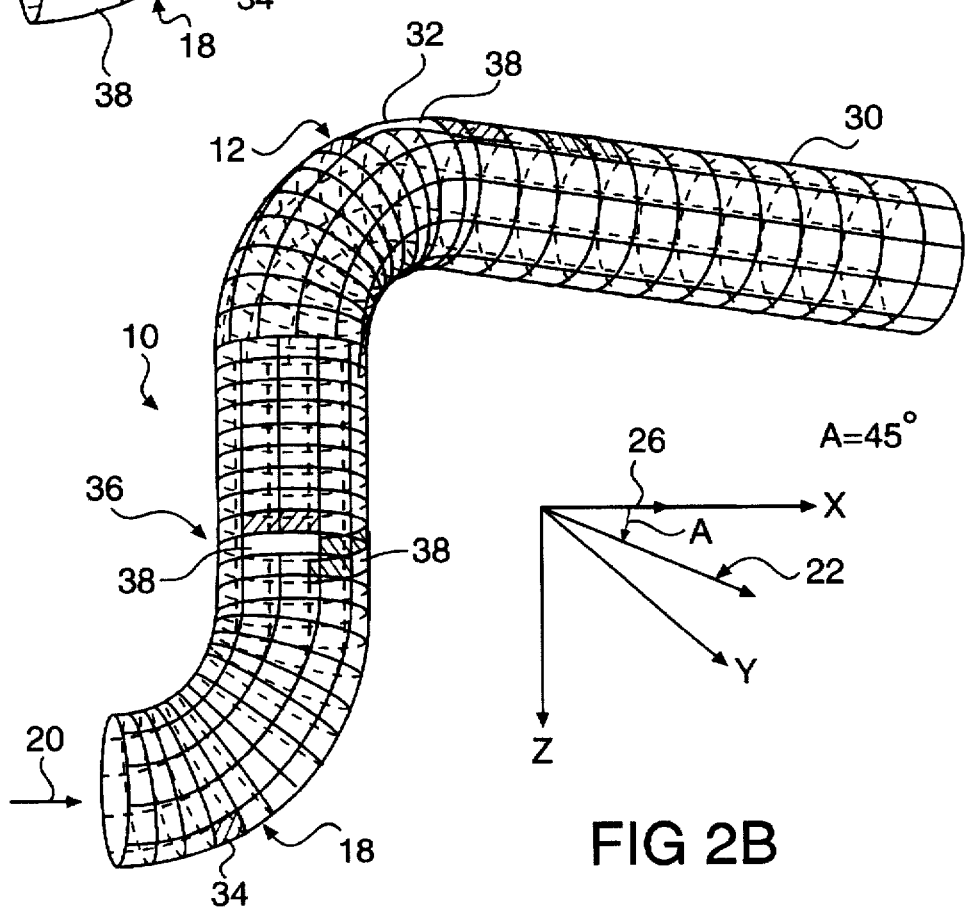
Figure 2C:
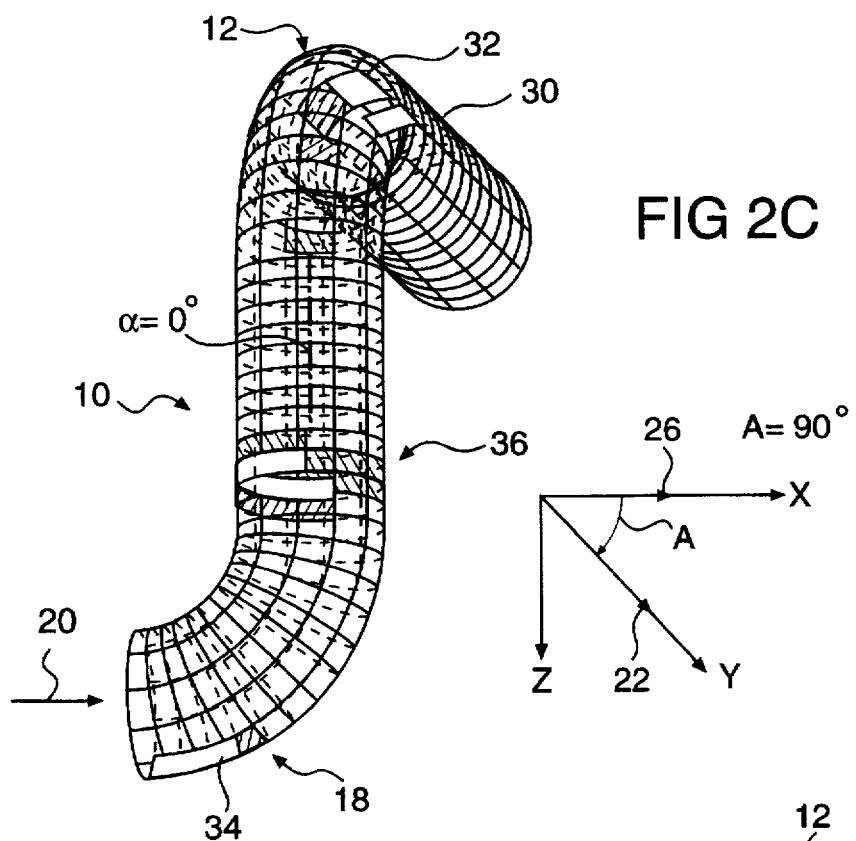
Figure 2D:
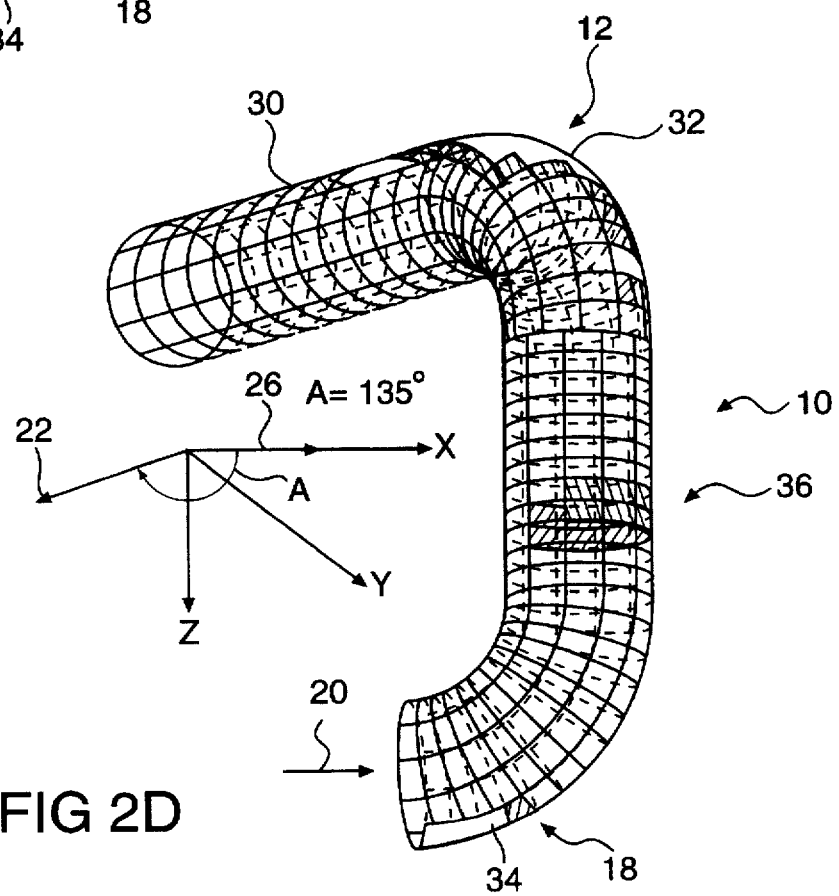
Figure 2E:
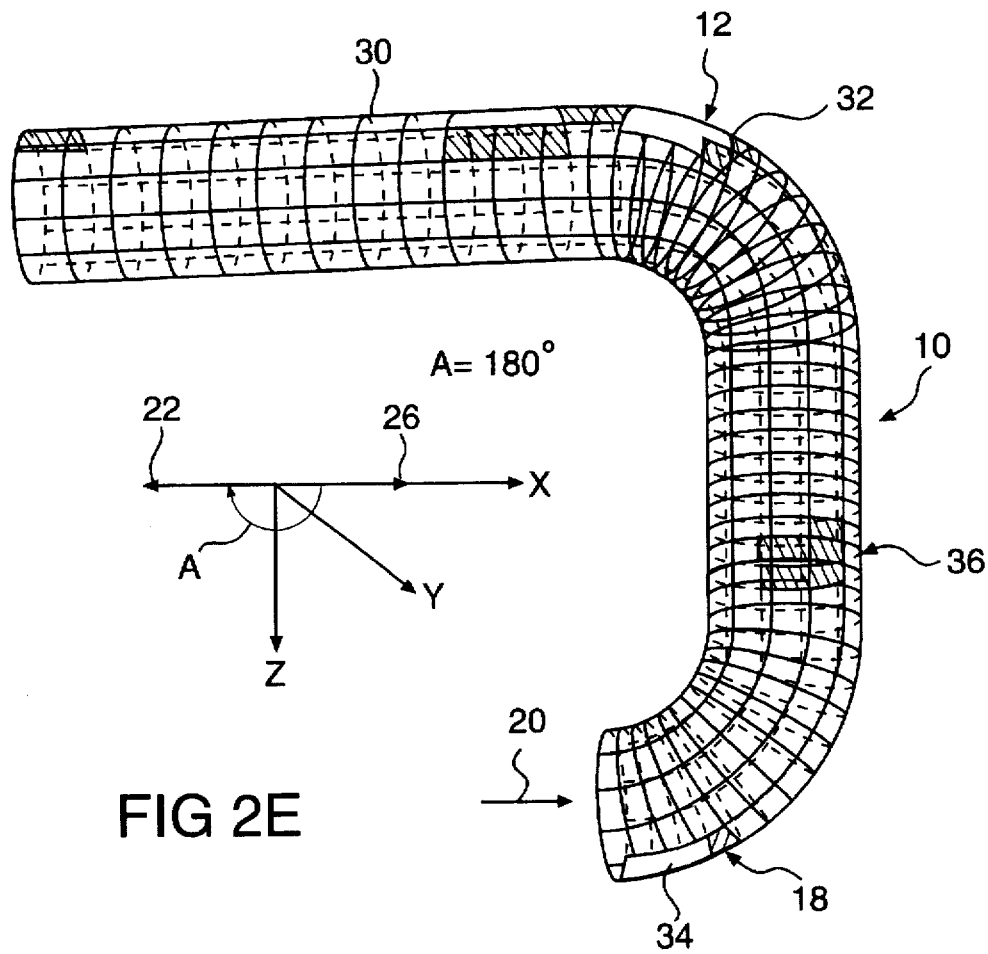

Through experimentation and numerical analysis, it has been discovered that the wear patterns and rates experienced in a dual elbow swivel joint vary depending on the relative angle between the female and male elbow members 12, 18. Thus, if certain relative angles can be maintained between these members, the erosive wear can be reduced in the dual elbow swivel joint. Referring to FIGS. 2A through 2E, a dual elbow swivel joint 10 similar to that depicted in FIG. 1 was analyzed with the female elbow member 12 oriented at different angles relative to male elbow member 18. As shown in FIG. 2A, a first analysis was conducted with the direction 22 of female elbow member 12 maintained at an angle A of 0° with respect to the direction 26 of male elbow member 18. As shown in FIG. 2B, a second analysis was conducted with the direction 22 of female elbow member 12 maintained at an angle A of 45° with respect to the direction 26 of male elbow member 18. As shown in FIGS. 2C through 2E, further analyses were conducted with the direction 22 maintained at angles of 90°, 135° and 180° with respect to the direction 26. The dual elbow swivel joint was analyzed with an outlet pipe 30 connected to the female elbow member 12. Also, for purposes of the following description, the female elbow member 12 is defined to include an upper elbow 32, the male elbow member 18 is defined to include a lower elbow 34, and the ball race area between female elbow member 12 and male elbow member 18 is defined as an inlet pipe 36.

During tests to establish the parameters for the above-mentioned analyses, a frac-fluid with 12 lbm/gallon 16–20 proppant was introduced into the swivel joint at a nominal flow velocity of 45 ft/sec in the direction shown by arrow 20. From the results of the analyses, the maximum wear zones for each configuration were determined. These maximum wear zones are depicted as solid areas 38 on each dual elbow swivel joint shown in FIGS. 2A through 2E. The hatched areas adjacent the solid areas 38 show the extent of the wear zone for 80% of the maximum wear value. The results of the analyses are summarized in Table 1, which presents a listing of the key wear amplitudes and averages in terms of maximum absolute power density, as taken from FIGS. 2A through 2E.

TABLE 1

Maximum Absolute Power Density Values

| Female Elbow Relative Angle | 0° (S-shaped) | 45° | 90° | 135° | 180° (U-shaped) |
|---|---|---|---|---|---|
| Lower Elbow | 3500 | 3500 | 3500 | 3500 | 3500 |
| Inlet Pipe | 5000 | 5000 | 5000 | 4800 | 4800 |
| Upper Elbow | 6100 | 8000 | 11600 | 8000 | 8300 |
| Outlet Pipe | 4500 | 5200 | 9200 | 6500 | 3400 |
| Mean Over Network | 4775 | 5425 | 7300 | 5700 | 5025 |
| Standard Deviation Over Network | 1080 | 1880 | 3700 | 1970 | 2290 |

From the results of the analyses, a system was devised which ranks the various orientations of the dual elbow swivel joint according to the wear experienced for each configuration. This ranking system is presented in Table 2. As shown in FIG. 2, several rankings were actually devised: rankings based on the system mean wear values, maximum wear rates in a component, and maximum wear rate multiplied by the area of wear. Thus, if using the system mean ranking system, one can easily discern that the maximum wear occurs when female elbow member 12 is oriented at 90° with respect to male elbow member 18. Similarly, the minimum wear occurs when female elbow member 12 is oriented at 0° relative to male elbow member 18.

TABLE 2

Rankings of Configurations for Wear Reduction
Scale: 1 (least wear) to 5 (most wear)

| Female Elbow Relative Angle | 0° (S-shaped) | 45° | 90° | 135° | 180°0 (U-shaped) |
|---|---|---|---|---|---|
| System Mean | 1 | 3 | 5 | 4 | 2 |
| Maximum Wear in System Component | 1$^c$ | 2$^b$ | 5$^b$, 4$^c$ | 2$^b$ | 3$^b$ |
| Maximum Wear Rate x Area Extent | 1* | 2 | 3, 4** | 5** | 3, 4* |

$^a$ = inlet pipe,
$^b$ = upper elbow,
$^c$ = outlet pipe
*High wear rate over a large area (potential for large area failure)
**High wear rate over a small area (high point penetration probability)

Figure 3:
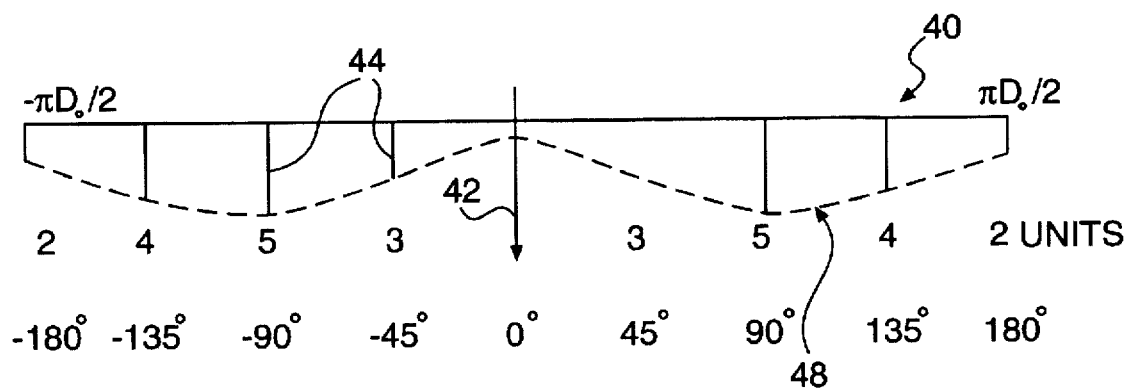
FIG. 3 is a depiction of the angle marker of the present invention.

According to the present invention, an orientation device is placed on the female and male elbow members 12, 18 to aid an operator in orienting the female elbow member 12 at an angle at which the dual elbow swivel joint 10 will experience minimum wear. Referring to FIGS. 1 and 3, the orientation device, indicated generally by reference number 40, comprises a reference mark 42 and a number of angle markings 44 located either on end 16 of male elbow member 18 (as shown in FIG. 1) or on shroud 14 of female elbow member 12. Angle markings 44 are preferably located around the circumference of the elbow member at predetermined angles from reference mark 42, as measured from the centerline of the member. Orientation device 40 further comprises an indicator mark 46 located on the elbow member opposite the elbow member which includes reference mark 42 and angle markings 44. For example, in the embodiment depicted in FIG. 1, indicator mark 46 is located on shroud 14 of female elbow member 12. Reference mark 42 and indicator mark 46 are located on their respective elbow members such that, when they are aligned, female elbow member 12 will be located at a predetermined angle relative to male elbow member 18. As shown in FIG. 1, when reference mark 42 and indicator mark 46 are aligned, female elbow member 12 will be oriented 0° with respect to male elbow member 18. Thus, female elbow member 12 may be oriented at any desired angle relative to male elbow member 18 by aligning indicator mark 46 with the appropriate angle marking 44.

In another embodiment of the invention, angle markings 44 each have a length which is related to the degree of wear experienced in the dual elbow swivel joint at that relative angle. In a preferred embodiment of the invention, the lengths of angle markings 44 at the relative angles are proportional to the system mean ranking values listed in Table 2, as shown in FIG. 3. If greater visibility of markings 44 is required, an appropriate multiplier may be applied to the ranking values, or the ranking values may be squared, to increase the length of markings 44 accordingly. In a further embodiment of the invention, a curve 48 (FIG. 3) may be constructed from the ranking values (or any desirable multiple or square thereof). In this embodiment, the height or width of the curve provides an indication of the relative angle corresponding to minimum wear without the need for individual angle markings 44. Thus, the degree of wear to be expected in dual elbow swivel joint 10 may be minimized by aligning indicator mark 46 with the shortest angle marking 44 or the portion of curve 48 having the smallest width.

In practice, angle markings 44 or curve 48 may be located on a strip decal applied to the elbow member or a metal band connected to the elbow member by appropriate means. Indicator mark 46 may be located on a similar strip decal or band attached to the opposite elbow member, or may be any other suitable marking.

It should be recognized that, while the present invention has been described in relation to the preferred embodiments thereof, those skilled in the art may develop a wide variation of structural details without departing from the principles of the invention. Therefore, the appended claims are to be construed to cover all equivalents falling within the true scope and spirit of the invention.

What is claimed is:

1. In combination with a dual elbow swivel joint having a first elbow member rotationally coupled to a second elbow member, the improvement which comprises:

an indicator mark located on the first elbow member;

a plurality of angle markings located on the second elbow member adjacent the first elbow member, the angle markings each corresponding to a predetermined relative angle between the first elbow member and the second elbow member;

wherein the first elbow member may be oriented at a desired angle relative to the second elbow member by aligning the indicator mark with an angle marking corresponding to the desired angle.

2. The swivel joint of claim 1, wherein the angle markings each comprise a length relating to a relative degree of wear experienced in the swivel joint when the first elbow member is oriented relative to the second elbow member at the predetermined angle corresponding to the angle marking.

3. The swivel joint of claim 2, wherein the angle markings define a curve having a width at a particular angle marking proportional to the length of the angle marking.

* * * * *